US012743383B2

(12) United States Patent
Wu

(10) Patent No.: US 12,743,383 B2
(45) Date of Patent: Sep. 22, 2026

(54) ADDRESS MONITOR DEVICE AND ADDRESS MONITOR METHOD

(71) Applicant: REALTEK SEMICONDUCTOR CORPORATION, Hsinchu (TW)

(72) Inventor: Chiu-Hung Wu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 117 days.

(21) Appl. No.: 18/813,099

(22) Filed: Aug. 23, 2024

(65) Prior Publication Data

US 2025/0173276 A1 May 29, 2025

(30) Foreign Application Priority Data

Nov. 28, 2023 (TW) ................................ 112146031

(51) Int. Cl.
*G06F 12/14* (2006.01)

(52) U.S. Cl.
CPC ...... *G06F 12/1458* (2013.01); *G06F 12/1441* (2013.01)

(58) Field of Classification Search
CPC ... G06F 12/1458; G06F 12/1441; G06F 21/52
See application file for complete search history.

(56) References Cited

U.S. PATENT DOCUMENTS 4,386,399 A * 5/1983 Rasala .................... G06F 12/14 711/158
4,398,243 A * 8/1983 Holberger ........... G06F 12/0292 711/E12.091
4,434,459 A * 2/1984 Holland .............. G06F 9/30181 712/210
5,038,282 A * 8/1991 Gilbert .................. G06F 9/3887 712/E9.067
5,121,498 A * 6/1992 Gilbert .................... G06F 8/452 717/149
5,255,359 A * 10/1993 Ebbers .................... G06T 17/00 345/506
6,820,192 B2 * 11/2004 Cho .................... G06F 11/3648 717/124

(Continued)

FOREIGN PATENT DOCUMENTS

TW 501007 B 9/2002
TW I460604 B 11/2014

OTHER PUBLICATIONS

Arm, Arm®v8-M Architecture Reference Manual, Copyright © 2015-2020 Arm Limited or its affiliates. All rights reserved.

(Continued)

*Primary Examiner* — Richard G Keehn
(74) *Attorney, Agent, or Firm* — WPAT, PC

(57) ABSTRACT

An address monitor device includes a boundary address register, a stack pointer register, and a comparator. The boundary address register is configured to monitor a boundary address of a stack based on a usage state of a stack pointer. The stack pointer register is configured to obtain a usage address of the stack at present based on the usage state of the stack pointer. The comparator is configured to compare the stack pointer and the boundary address for determining whether to output an interrupt command.

20 Claims, 7 Drawing Sheets

(56) References Cited

U.S. PATENT DOCUMENTS

| | | | | |
|---|---|---|---|---|
| 7,735,099 | B1 * | 6/2010 | Micalizzi, Jr. | H04L 69/321<br>709/215 |
| 9,311,255 | B2 * | 4/2016 | Muchsel | G06F 12/1491 |
| 2004/0153672 | A1 * | 8/2004 | Watt | G06F 21/52<br>726/22 |
| 2007/0285271 | A1 * | 12/2007 | Erlingsson | G06F 21/52<br>340/815.84 |
| 2008/0163359 | A1 * | 7/2008 | Conti | G06F 21/52<br>726/17 |
| 2012/0030518 | A1 * | 2/2012 | Rajwar | G06F 9/467<br>714/45 |
| 2012/0311307 | A1 * | 12/2012 | Chynoweth | G06F 9/30087<br>712/234 |
| 2014/0013132 | A1 * | 1/2014 | de Rochemont | G06F 1/3203<br>713/320 |
| 2015/0150024 | A1 * | 5/2015 | Grossi | G06F 9/30134<br>718/107 |
| 2015/0220464 | A1 * | 8/2015 | Heisswolf | G06F 21/52<br>710/267 |
| 2016/0378498 | A1 * | 12/2016 | Caprioli | G06F 9/30101<br>712/233 |
| 2020/0192454 | A1 * | 6/2020 | de Rochemont | G06F 1/3203 |

OTHER PUBLICATIONS

OA letter of a counterpart TW application (appl. No. 112146031) mailed on Nov. 21, 2024.

* cited by examiner

ADDRESS MONITOR DEVICE AND ADDRESS MONITOR METHOD

BACKGROUND OF THE INVENTION

1. Field of the Invention

The present disclosure relates to an address monitor device and an address monitor method, especially to an address monitor device and an address monitor method that determine whether to output an interrupt command by comparing a stack pointer and a boundary address.

2. Description of Related Art

The Physical Memory Protection (PMP) mechanism sets a guard region in a stack. If a stack pointer (SP) falls into the guard region, an exception handler is activated to perform a debugging process or restart a system. However, if the movement of the stack pointer (SP) is large, and the stack pointer (SP) directly crosses the entire guard region, in other words, if the stack pointer (SP) does not fall into the guard region, the detection mechanism of the PMP will be failed.

SUMMARY OF THE INVENTION

In some aspects, an object of the present disclosure is to, but not limited to, provides an address monitor device and an address monitor method that makes an improvement to the prior art.

An embodiment of an address monitor device of the present disclosure includes a boundary address register, a stack pointer register, and a comparator. The boundary address register is configured to monitor a boundary address of a stack based on a usage state of a stack pointer. The stack pointer register is configured to obtain a usage address of the stack at present based on the usage state of the stack pointer. The comparator is configured to compare the stack pointer and the boundary address for determining whether to output an interrupt command.

An embodiment of an address monitor method of the present disclosure includes: monitoring a boundary address of a stack based on a usage state of a stack pointer by a boundary address register; obtaining a usage address of the stack at present based on the usage state of the stack pointer by a stack pointer register; and comparing the stack pointer and the boundary address for determining whether to output an interrupt command by a comparator.

Technical features of some embodiments of the present disclosure make an improvement to the prior art. The address monitor device and the address monitor method of the present disclosure determine whether to output the interrupt command by comparing the stack pointer and the boundary address. If the stack pointer exceeds the boundary address, the address monitor device and the address monitor method of the present disclosure will output the interrupt command to perform a debugging process, a repairing process, or any other appropriate processes, thereby preventing the use of areas outside the stack of its own. Therefore, the present disclosure can avoid detection mechanism failures of the Physical Memory Protection (PMP).

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

To address problems in the prior art where a significant movement of a stack pointer directly crossing an entire guard region leads to detection failures in the physical memory protection mechanism, the present disclosure provides an address monitor device and an address monitor method, as explained in detail below.

Figure 1:
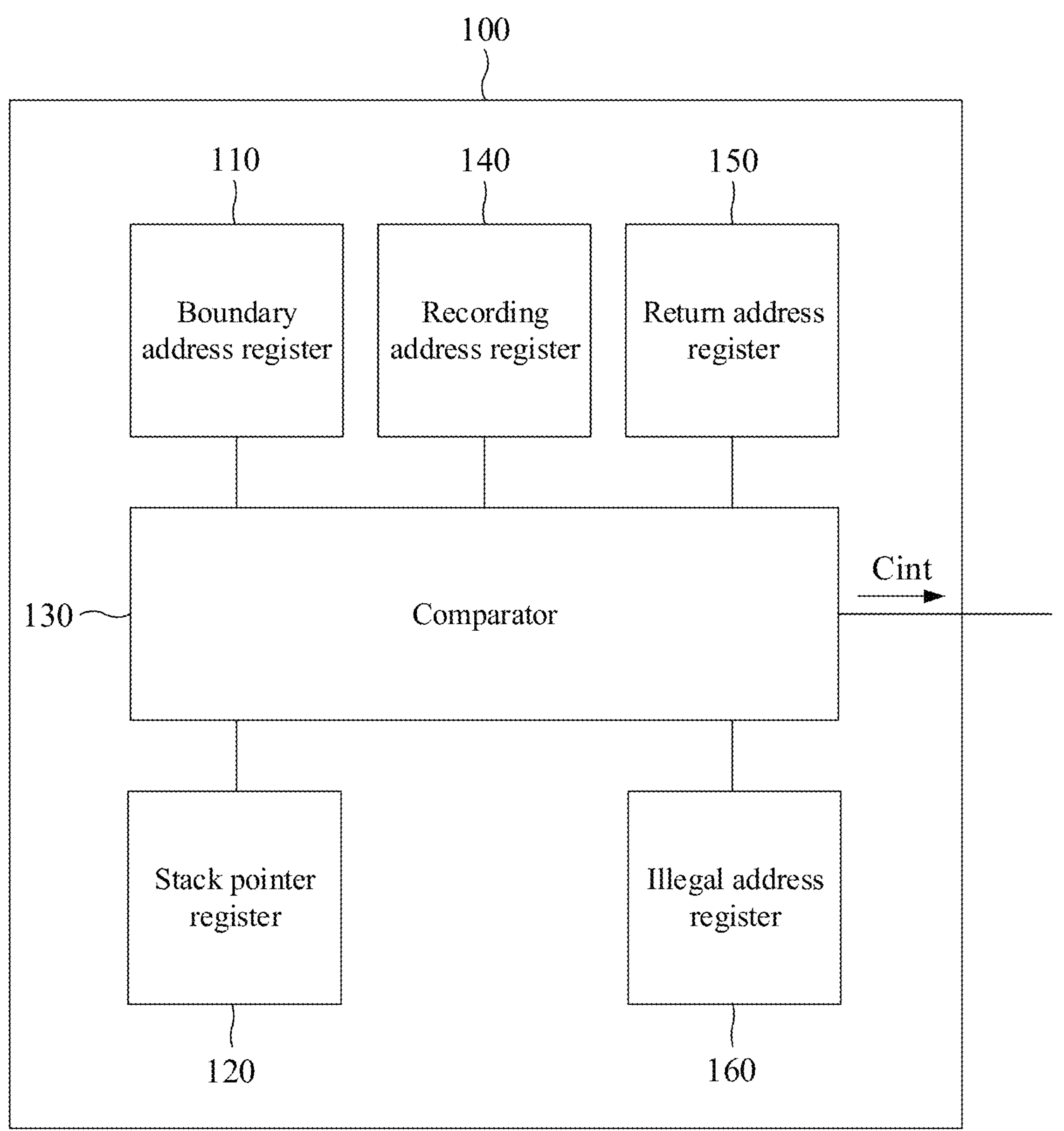
FIG. 1 shows an embodiment of an address monitor device of the present disclosure.
Figure 2:
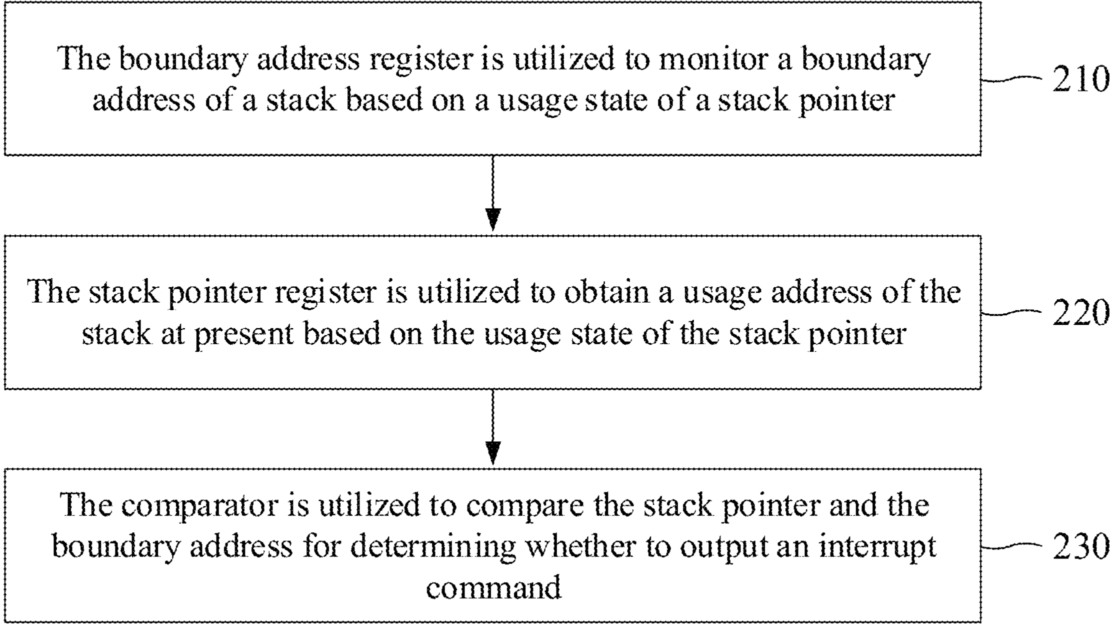
FIG. 2 shows an embodiment of a flow diagram of an address monitor method of the present disclosure.

FIG. 1 shows an embodiment of an address monitor device 100 of the present disclosure. As shown in the figure, the address monitor device 100 includes a boundary address register 110, a stack pointer (SP) register 120, a comparator 130, a recording address register 140, a return address (RA) register 150, and an illegal address register 160. With respect to connections, the boundary address register 110, the stack pointer register 120, the recording address register 140, the return address register 150, and the illegal address register 160 are all coupled to the comparator 130. For facilitating the understanding of the operations of the address monitor device 100, reference is now made to FIG. 2. FIG. 2 shows an embodiment of a flow diagram of an address monitor method 200 of the present disclosure.

Figure 3:
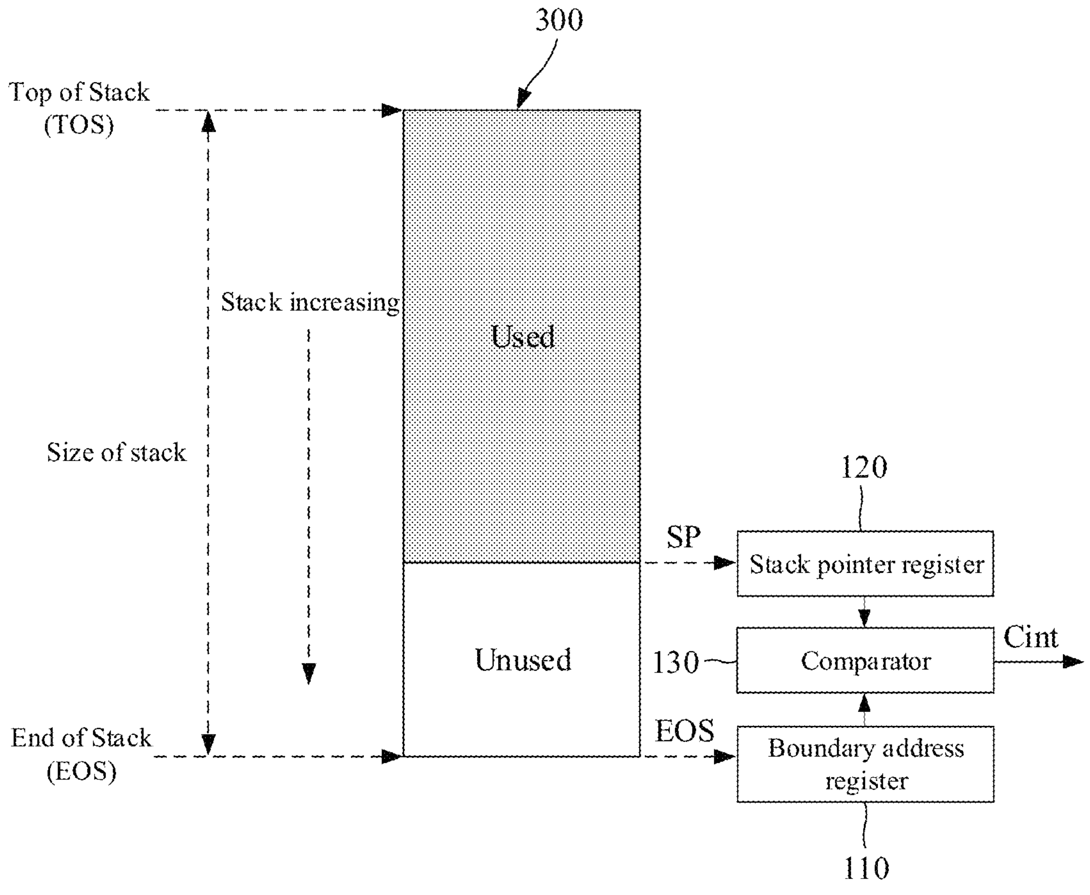
FIG. 3 shows an embodiment of an operation diagram of an address monitor device of the present disclosure.
Figure 4:
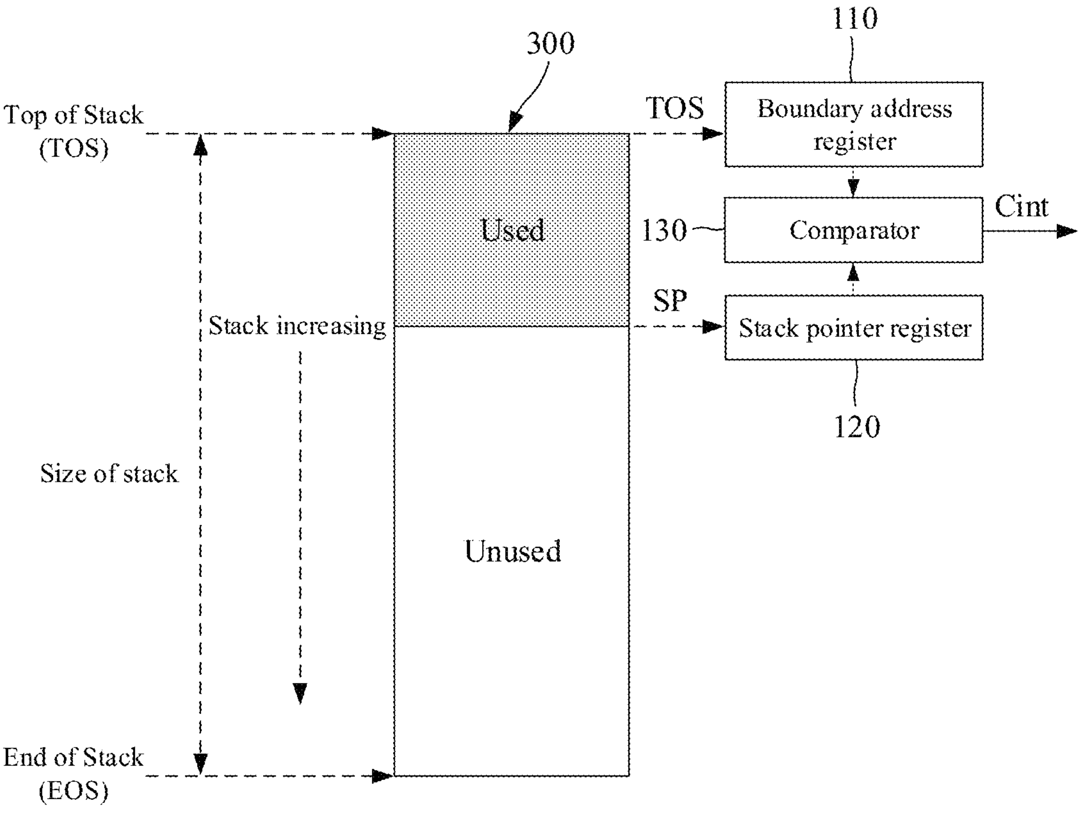
FIG. 4 shows an embodiment of an operation diagram of an address monitor device of the present disclosure.

In the step 210, the boundary address register 110 is utilized to monitor a boundary address of a stack based on a usage state of a stack pointer. For example, referring to FIG. 3, if the usage state of the stack 300 is increasing, the usage state of the stack pointer SP is decreasing accordingly. As shown in FIG. 3, if the usage state of the stack 300 is increasing or the usage state of the stack pointer SP is decreasing, the boundary address register 110 monitors the bottom address EOS (End of Stack) of the stack 300. On the other hand, referring to FIG. 4, if the usage state of the stack 400 is decreasing, the usage state of the stack pointer SP is increasing accordingly. As shown in FIG. 4, if the usage state of the stack 300 is decreasing or the usage state of the stack pointer SP is increasing, the boundary address register 110 monitors the top address TOS (Top of Stack) of the stack 300.

In the step 220, the stack pointer register 120 is utilized to obtain a usage address of the stack at present based on the usage state of the stack pointer. For example, referring to FIG. 3 and FIG. 4, with the usage of the stack 300, the usage state of the stack 300 is increasing or decreasing, the stack pointer register 120 can obtain the usage address of the stack at the moment.

In the step 230, the comparator 130 is utilized to compare the stack pointer and the boundary address for determining whether to output an interrupt command. For example, referring to FIG. 3, if the usage state of the stack 300 is increasing or the usage state of the stack pointer SP is decreasing, the comparator 130 compares the stack pointer SP and the bottom address EOS. Assume that the movement of the stack pointer SP is large, the stack pointer SP may directly cross the bottom address EOS, and use areas outside the stack of its own. To address the above-mentioned problem, the present disclosure utilizes the comparator 130 to compare the stack pointer SP and the bottom address EOS. If the stack pointer SP is less than the bottom address EOS, the interrupt command Cint is outputted to perform a debugging process, a repairing process, or any other appropriate processes, thereby preventing the use of areas outside the stack of its own.

Reference is now made to FIG. 4, if the usage state of the stack 300 is decreasing or the usage state of the stack pointer SP is increasing, the comparator 130 compares the stack pointer SP and a top address TOS. Assume that the movement of the stack pointer SP is large, the stack pointer SP may directly cross the top address TOS, and use areas outside the stack of its own. To address the above-mentioned problem, the present disclosure utilizes the comparator 130 to compare the stack pointer SP and the top address TOS. If the stack pointer SP is greater than the top address TOS, the interrupt command Cint is outputted to perform a debugging process, a repairing process, or any other appropriate processes, thereby preventing the use of areas outside the stack of its own.

Figure 5:
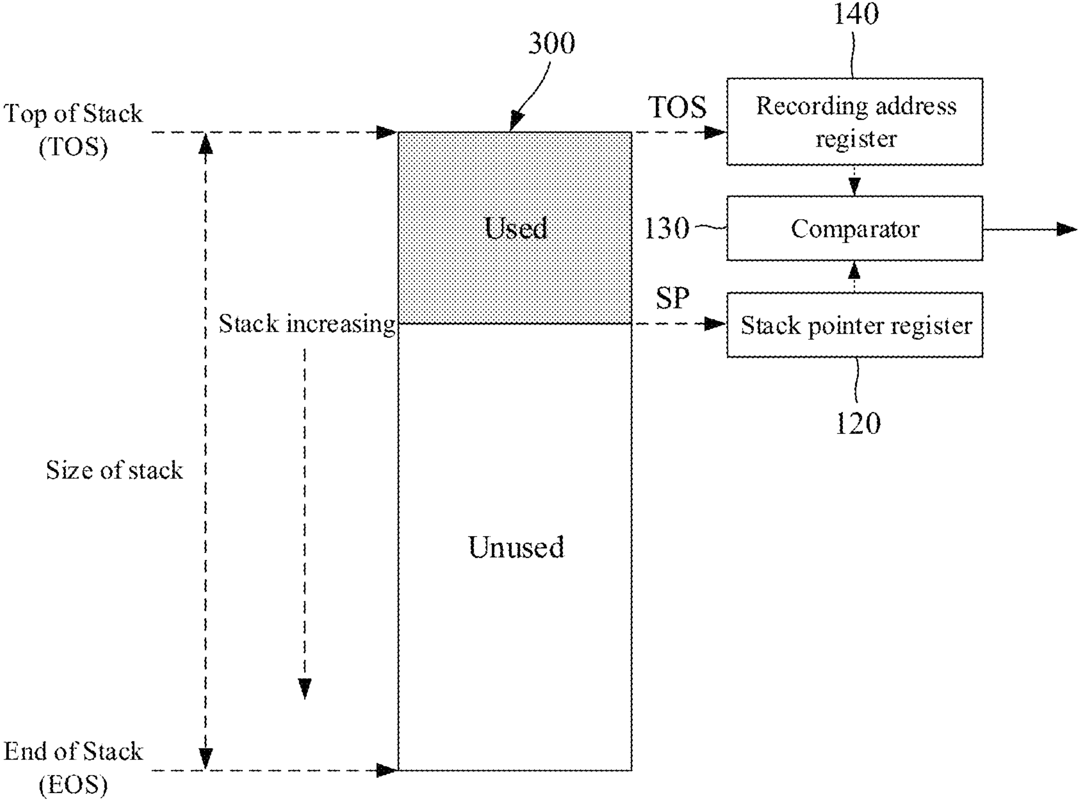
FIG. 5 shows an embodiment of an operation diagram of an address monitor device of the present disclosure.

FIG. 5 shows an embodiment of an operation diagram of an address monitor device 100 of the present disclosure. As shown in the figure, if the usage state of the stack 300 is increasing or the usage state of the stack pointer SP is decreasing, the recording address register 140 registers the top address TOS of the stack 300 to serve as a recording address. The comparator 130 compares the stack pointer SP and the recording address (initially set as the top address TOS). If the stack pointer SP is less than the recording address (initially set as the top address TOS), the recording address register 140 sets a pointer value of the stack pointer SP to be a new record value (initially set as the top address TOS).

Through the above-mentioned operations, after the recording address register 140 operates for a period (e.g., 10 days), the address recorded by the recording address register 140 is a period minimum value of the stack pointer SP. Subsequently, the difference calculated from the top address TOS and the period minimum value of the stack pointer SP is the period maximum consumption of the stack 300. The present disclosure obtains the period maximum consumption of the stack 300 through the above-mentioned operations to adjust the size of stack (SOS) of the stack 300 for optimizing the usage of the memory. The present disclosure is not limited to the above-mentioned embodiment, and the above-mentioned embodiment is merely an example for illustrating one of the implements of the present disclosure. The present disclosure may utilize other suitable periods, for example, 15 days, 20 days, depending on the worst-case actual requirement.

Figure 6:
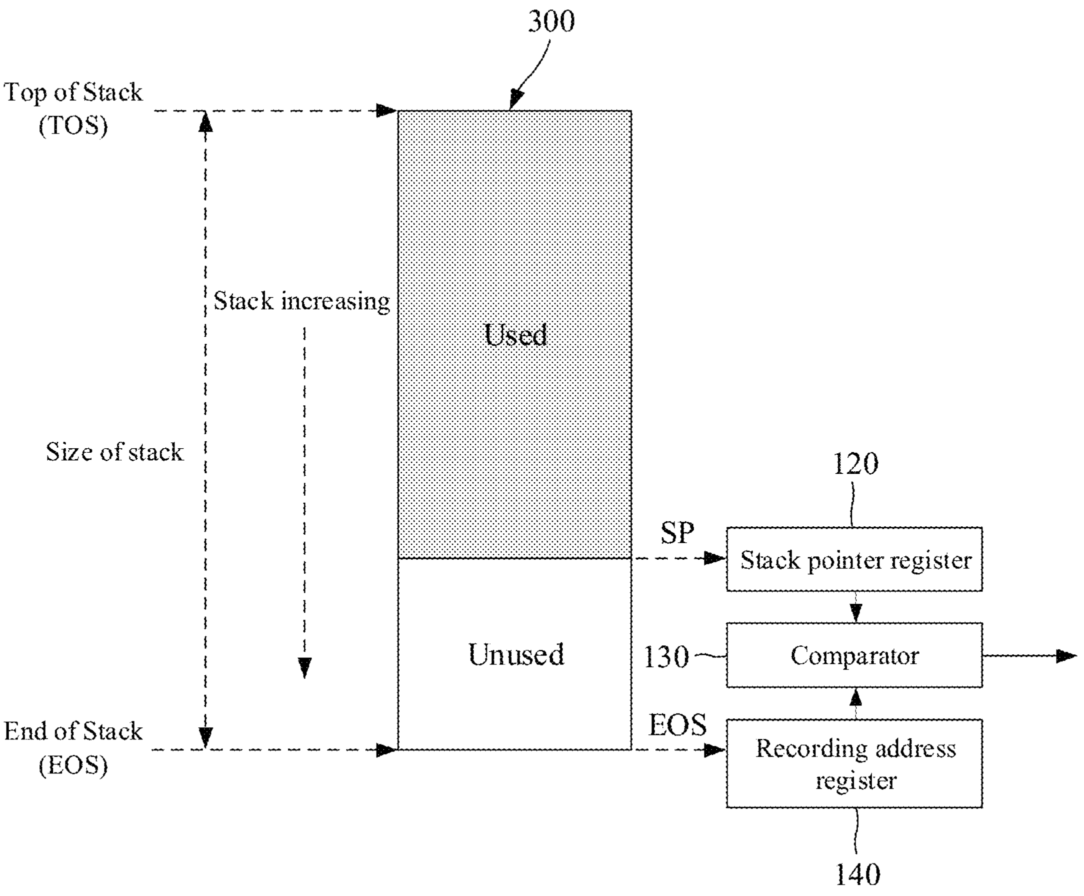
FIG. 6 shows an embodiment of an operation diagram of an address monitor device of the present disclosure.

FIG. 6 shows an embodiment of an operation diagram of an address monitor device 100 of the present disclosure. As shown in the figure, if the usage state of the stack 300 is decreasing or the usage state of the stack pointer SP is increasing, the recording address register 140 registers the bottom address EOS of the stack 300 to serve as the recording address. The comparator 130 compares the stack pointer SP and the recording address (initially set as the bottom address EOS). If the stack pointer SP is greater than the recording address (initially set as the bottom address EOS), the recording address register 140 sets a pointer value of the stack pointer SP to be a new record value (initially set as the bottom address EOS).

Through the above-mentioned operations, after the recording address register 140 operates for a period (e.g., 10 days), the address recorded by the recording address register 140 is a period maximum value of the stack pointer SP. Subsequently, the difference calculated from the bottom address EOS and the period maximum value of the stack pointer SP is the period minimum consumption of the stack 300. The present disclosure obtains the period minimum consumption of the stack 300 through the above-mentioned operations to adjust the size of stack (SOS) of the stack 300 for optimizing the usage of the memory. The present disclosure is not limited to the above-mentioned embodiment, and the above-mentioned embodiment is merely an example for illustrating one of the implements of the present disclosure. The present disclosure may utilize other suitable periods, for example, 15 days, 20 days, depending on the best-case actual requirement.

Figure 7:
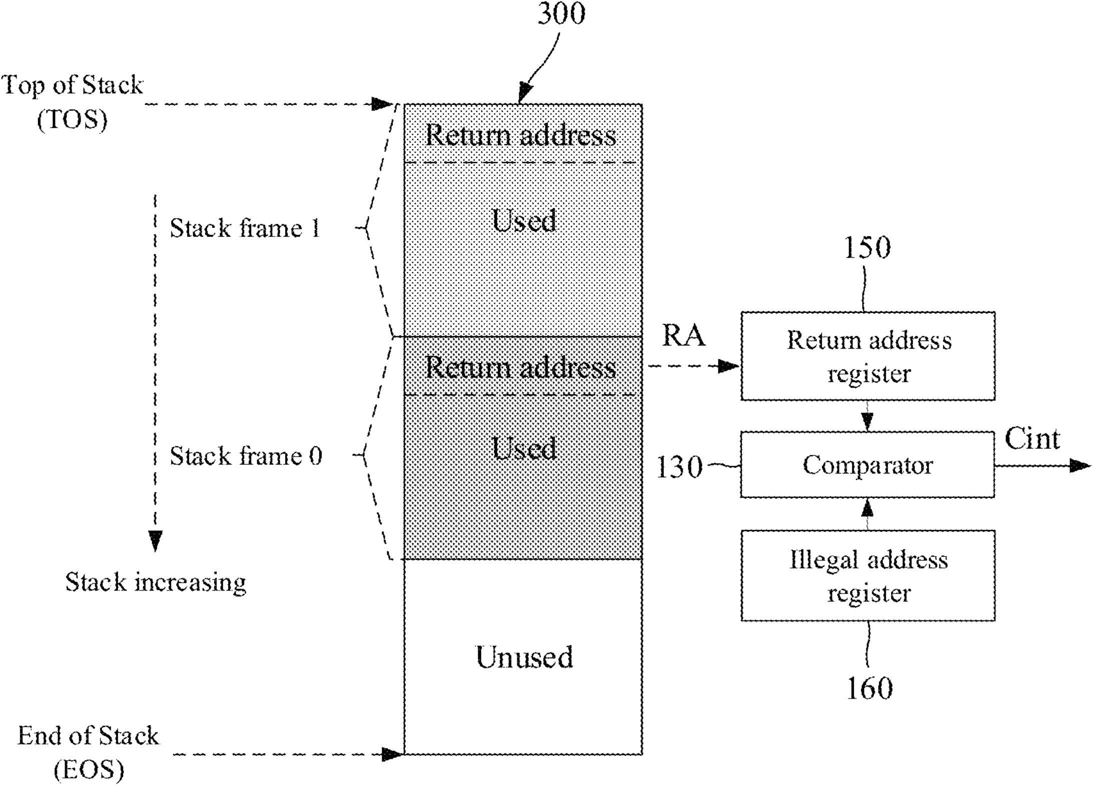
FIG. 7 shows an embodiment of an operation diagram of an address monitor device of the present disclosure.

FIG. 7 shows an embodiment of an operation diagram of an address monitor device 100 of the present disclosure. As shown in the figure, the return address register 150 is configured to obtain a return address (RA) of a function at present. The illegal address register 160 is configured to monitor an illegal address, for example, the illegal address 0xffffffff. The comparator 130 compares the return address RA and the illegal address. If the return address RA is equal to the illegal address, it represents that the function may return to an incorrect address. At this time, the interrupt command Cint is outputted to perform a debugging process, a repairing process, or any other appropriate processes, thereby preventing from returning to the illegal address. The present disclosure is not limited to the above-mentioned embodiment, and the above-mentioned embodiment is merely an example for illustrating one of the implements of the present disclosure. The present disclosure may utilize other illegal addresses which need to be detected depending on actual requirements.

It is noted that the present disclosure is not limited to the embodiments as shown in FIG. 1 to FIG. 7, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

As described above, technical features of some embodiments of the present disclosure make an improvement to the prior art. The address monitor device and the address monitor method of the present disclosure determine whether to output the interrupt command by comparing the stack pointer and the boundary address. If the stack pointer exceeds the boundary address, the address monitor device and the address monitor method of the present disclosure will output the interrupt command to perform a debugging process, a repairing process, or any other appropriate processes, thereby preventing the use of areas outside the stack of its own. Therefore, the present disclosure can avoid detection mechanism failures of the Physical Memory Protection (PMP).

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An address monitor device, comprising:

a boundary address register, configured to monitor a boundary address of a stack based on a usage state of a stack pointer;

a stack pointer register, configured to obtain a usage address of the stack at present based on the usage state of the stack pointer; and a comparator, configured to compare the stack pointer and the boundary address for determining whether to output an interrupt command.

2. The address monitor device of claim 1, wherein if the usage state of the stack pointer is decreasing, the boundary address register monitors a bottom address EOS of the stack;

wherein the comparator compares the stack pointer and the bottom address EOS, if the stack pointer is less than the bottom address EOS, the interrupt command is outputted.

3. The address monitor device of claim 1, wherein if the usage state of the stack pointer is increasing, the boundary address register monitors a top address of the stack;

wherein the comparator compares the stack pointer and the top address, if the stack pointer is greater than the top address, the interrupt command is outputted.

4. The address monitor device of claim 1, further comprising:

a recording address register, if the usage state of the stack pointer is decreasing, the recording address register records a top address of the stack to serve as a recording address;

wherein the comparator compares the stack pointer and the recording address, if the stack pointer is less than the recording address, the recording address register sets a pointer value of the stack pointer to be a new record value.

5. The address monitor device of claim 4, wherein after the recording address register operates for a period, the recording address recorded by the recording address register is a period minimum value of the stack pointer.

6. The address monitor device of claim 5, wherein a difference between the top address and the stack pointer is a period maximum consumption of the stack.

7. The address monitor device of claim 1, further comprising:

a recording address register, wherein if the usage state of the stack pointer is increasing, the recording address register records a bottom address EOS of the stack to serve as a recording address;

wherein the comparator compares the stack pointer and the recording address, if the stack pointer is greater than the recording EOS address, the recording address register sets a pointer value of the stack pointer to be a new record value.

8. The address monitor device of claim 7, wherein after the recording address register operates for a period, the recording address recorded by the recording address register is a period maximum value of the stack pointer.

9. The address monitor device of claim 8, wherein a difference between the bottom address and the stack pointer is a period minimum consumption of the stack.

10. The address monitor device of claim 1, further comprising:

a return address register, configured to obtain a return address of a function at present; and an illegal address register, configured to monitor an illegal address;

wherein the comparator compares the return address and the illegal address, if the return address is equal to the illegal address, the interrupt command is outputted.

11. An address monitor method, comprising:

monitoring a boundary address of a stack based on a usage state of a stack pointer by a boundary address register;

obtaining a usage address of the stack at present based on the usage state of the stack pointer by a stack pointer register; and comparing the stack pointer and the boundary address for determining whether to output an interrupt command by a comparator.

12. The address monitor method of claim 11, wherein a step of monitoring the boundary address of the stack based on the usage state of the stack pointer by the boundary address register comprises:

if the usage state of the stack pointer is decreasing, monitoring a bottom address EOS of the stack by the boundary address register;

wherein a step of comparing the stack pointer and the boundary address for determining whether to output the interrupt command by the comparator comprises:

comparing the stack pointer and the bottom address EOS by the comparator, if the stack pointer is less than the bottom address EOS, outputting the interrupt command.

13. The address monitor method of claim 11, wherein a step of monitoring the boundary address of the stack based on the usage state of the stack pointer by the boundary address register comprises:

if the usage state of the stack pointer is increasing, monitoring a top address TOS of the stack by the boundary address register;

wherein a step of comparing the stack pointer and the boundary address for determining whether to output the interrupt command by the comparator comprises:

comparing the stack pointer and the top address TOS by the comparator, if the stack pointer is greater than the top address, outputting the interrupt command.

14. The address monitor method of claim 11, further comprising:

if the usage state of the stack pointer is decreasing, registering a top address of the stack by a recording address register to serve as a recording address; and comparing the stack pointer and the recording address by the comparator, if the stack pointer is less than the recording address, setting a pointer value of the stack pointer to be a new record value by the recording address register.

15. The address monitor method of claim 14, further comprising:

after the recording address register operates for a period, the recording address recorded by the recording address register being a period minimum value of the stack pointer.

16. The address monitor method of claim 15, wherein a difference between the top address and the period minimum value of the stack pointer comprises a period maximum consumption of the stack.

17. The address monitor method of claim 11, further comprising:

if the usage state of the stack pointer is increasing, registering a bottom address EOS of the stack by a recording address register to serve as a recording address; and comparing the stack pointer and the recording address by the comparator, if the stack pointer is greater than the recording address, setting a pointer value of the stack pointer to be a new record value by the recording address register.

18. The address monitor method of claim 17, further comprising:

after the recording address register operates for a period, the recording address recorded by the recording address register being a period maximum value of the stack pointer.

19. The address monitor method of claim 18, wherein a difference between the bottom address and the period maximum value of the stack pointer comprises a period minimum consumption of the stack.

20. The address monitor method of claim 11, further comprising:

obtaining a return address of a function at present by a return address register;

monitoring an illegal address by an illegal address register; and comparing the return address and the illegal address by the comparator, if the return address is equal to the illegal address, outputting the interrupt command.

* * * * *